United States Patent [19]

Kaetzel

[11] 4,188,773
[45] Feb. 19, 1980

[54] MOWER-CONDITIONER

[75] Inventor: Pierre Kaetzel, Saverne, France

[73] Assignee: Samibem, S.A., Marmoutier, France

[21] Appl. No.: 874,644

[22] Filed: Feb. 2, 1978

[30] Foreign Application Priority Data

Sep. 16, 1977 [FR] France .................. 77 28541

[51] Int. Cl.² .......................................... A01D 35/264
[52] U.S. Cl. .......................................... 56/192; 56/6; 56/DIG. 1
[58] Field of Search ................. 56/1, DIG. 1, 6, 14.9, 56/15.6, 16.2, 17.3, 12.7, 192, 228, 218, 15.9

[56] References Cited

U.S. PATENT DOCUMENTS

| | | | |
|---|---|---|---|
| 2,529,612 | 11/1950 | Kayser | 56/16.2 |
| 2,704,429 | 3/1955 | Scarlett et al. | 56/DIG. 1 |
| 3,383,844 | 5/1968 | Glass et al. | 56/DIG. 1 |
| 3,469,378 | 9/1969 | Heesters et al. | 56/11.9 |
| 3,507,102 | 4/1970 | Kline et al. | 56/16.2 |
| 3,673,779 | 7/1972 | Scarnato et al. | 56/DIG. 1 |
| 3,676,988 | 7/1972 | Hauser-Lienhard | 56/192 |
| 3,699,755 | 10/1972 | Hauser | 56/DIG. 1 |
| 3,972,159 | 8/1976 | Oosterling et al. | 56/16.2 |
| 4,077,192 | 3/1978 | Klinner et al. | 56/DIG. 1 |

FOREIGN PATENT DOCUMENTS

| | | | |
|---|---|---|---|
| 1582270 | 7/1970 | Fed. Rep. of Germany | 56/6 |
| 1782805 | 5/1973 | Fed. Rep. of Germany | 56/16.2 |
| 2316858 | 2/1977 | France | 56/6 |

*Primary Examiner*—Russell R. Kinsey
*Assistant Examiner*—Paul J. Hirsch
*Attorney, Agent, or Firm*—Young & Thompson

[57] ABSTRACT

The disclosure is of a mower-conditioner comprising a cutting mechanism with discs driven from beneath and a conditioning mechanism extending in a conditioning passage the width of which is less than the cutting width, the discs situated outside the zone in which the conditioning mechanism extends being provided respectively with a truncated cone intended to separate the standing fodder from the cut fodder, each of these truncated cones being respectively surmounted by a fixed deflector the flank of which extends at the same time upwards and towards the interior of the conditioning passage, said deflector being connected to the front edge of the said conditioning passage in a smoothly continuous manner.

8 Claims, 5 Drawing Figures

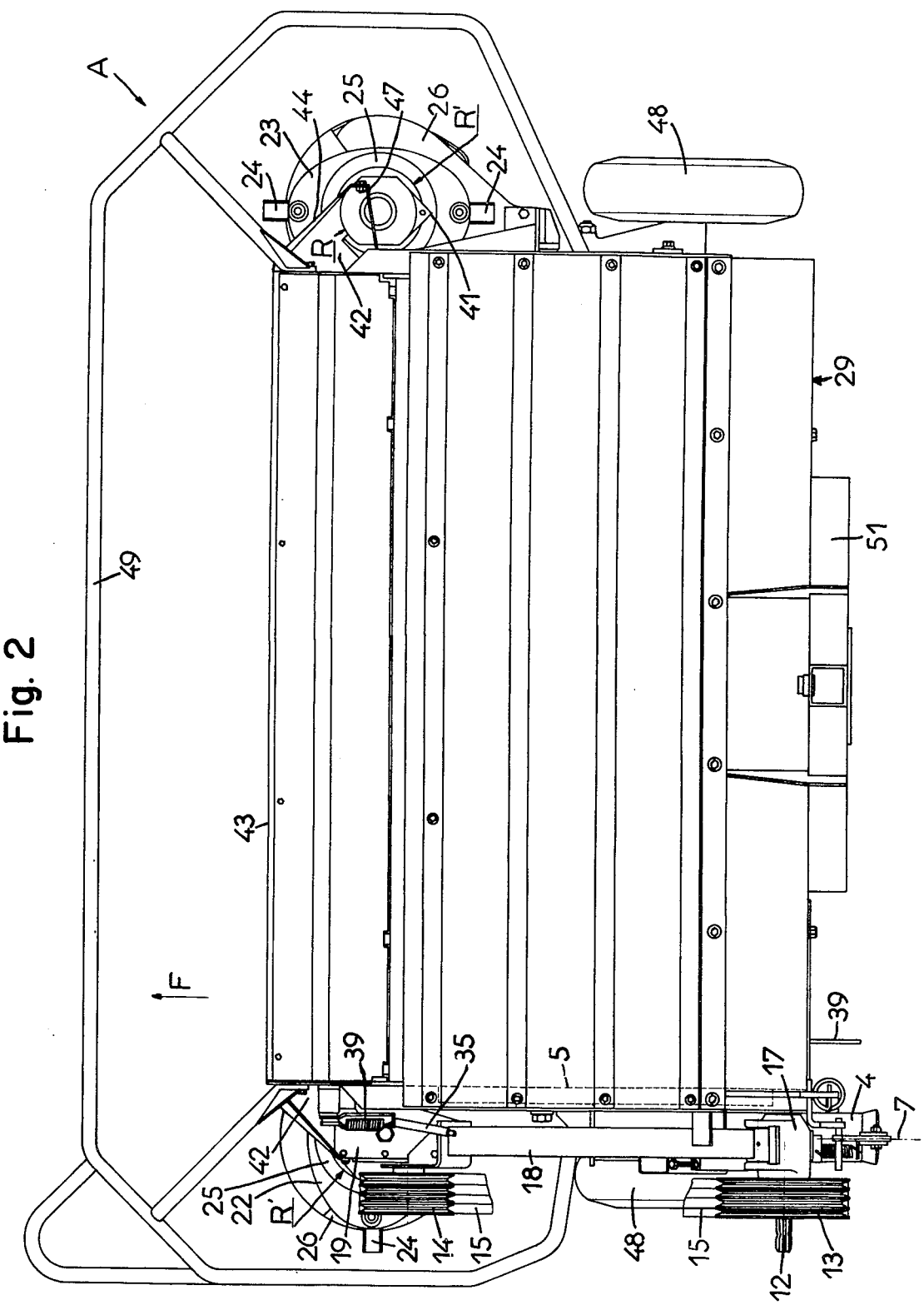

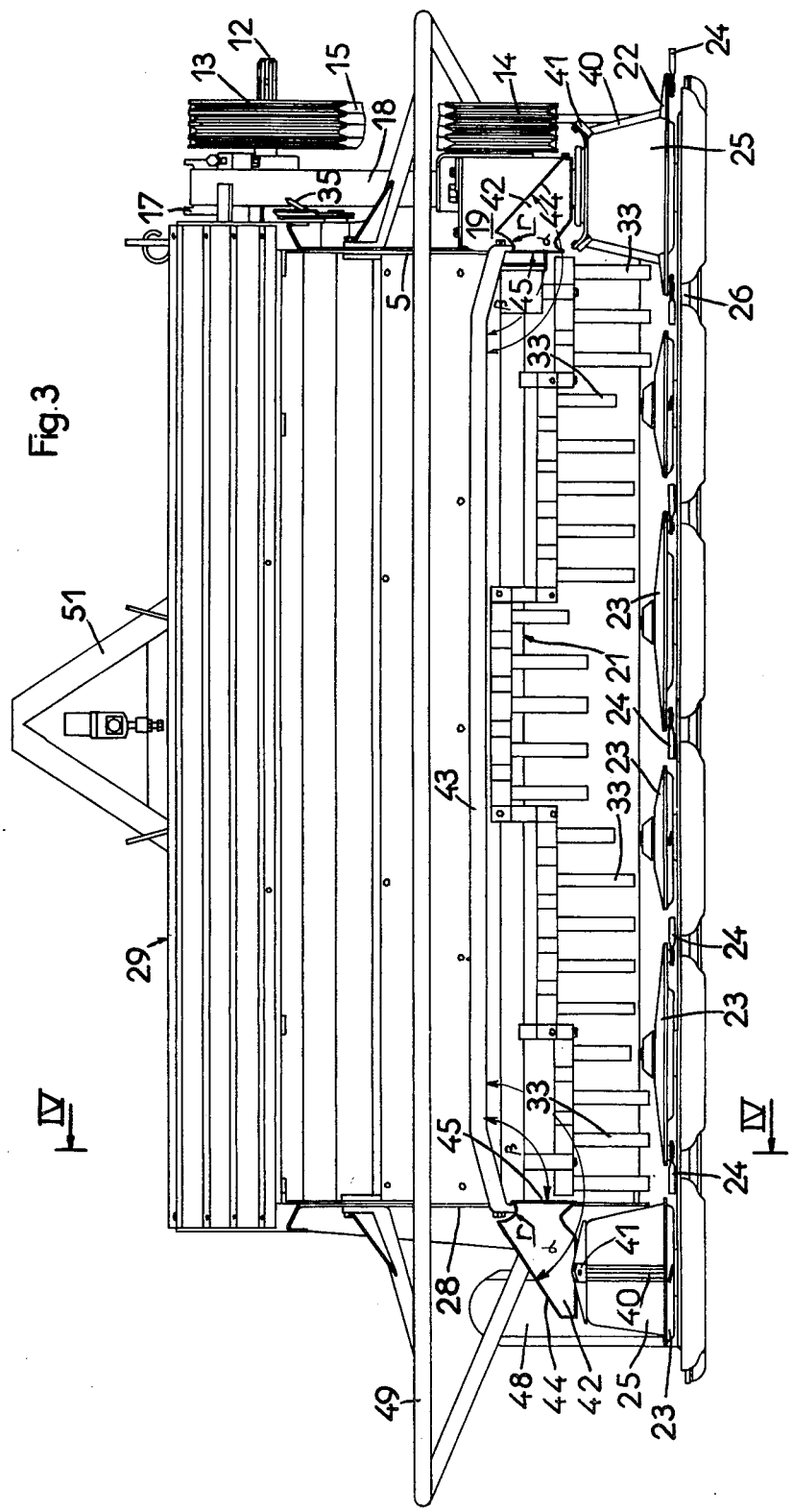

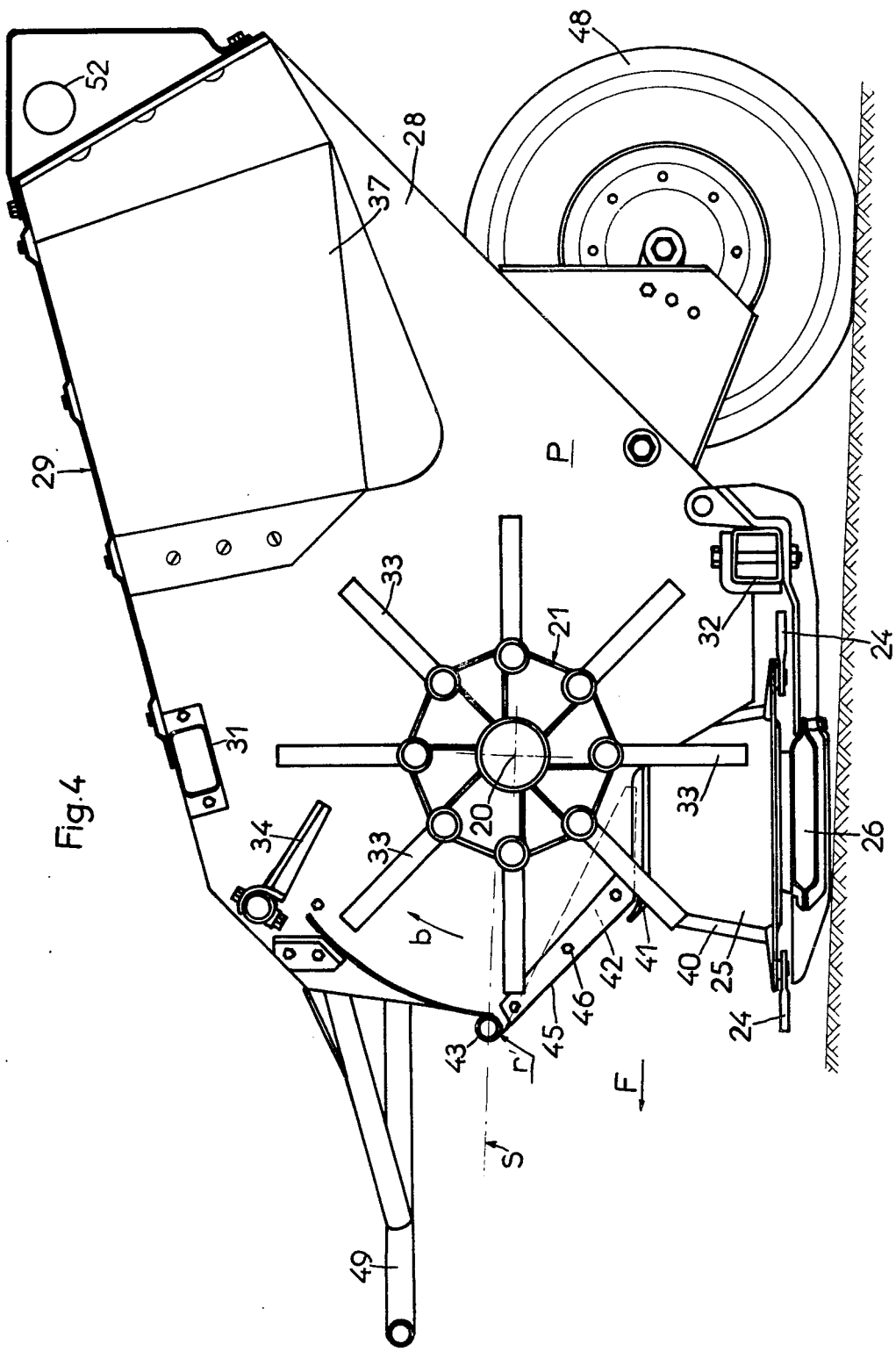

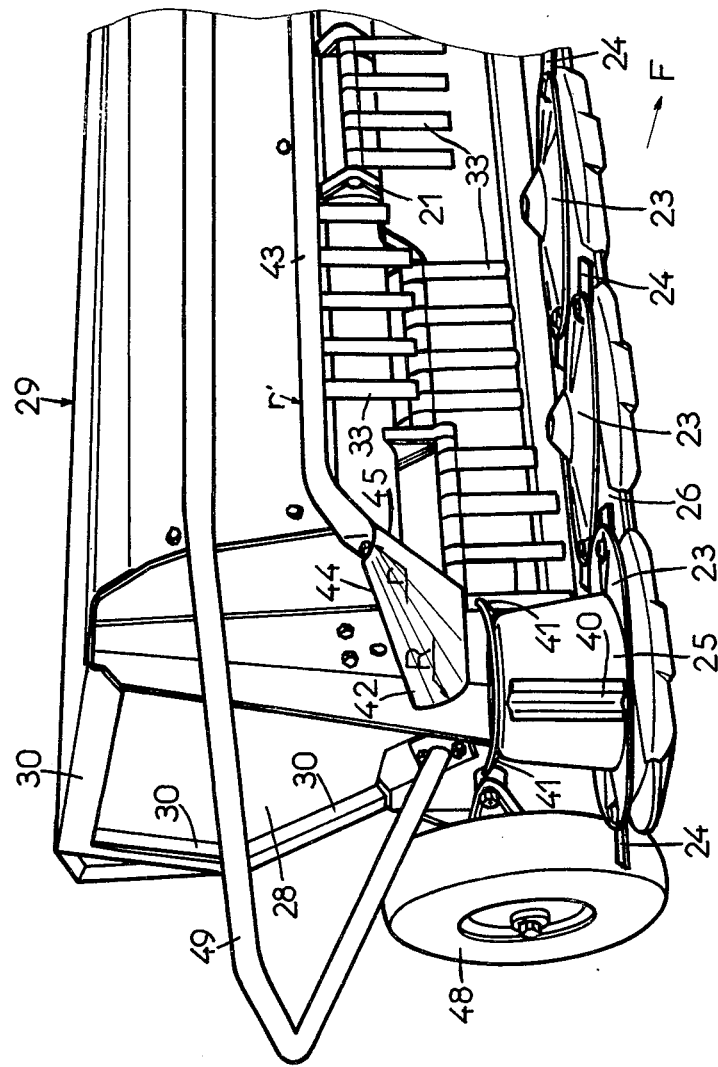

even though the supports of these cutting members tend to direct this fodder towards the conditioning members. In fact at least one of said supports, which preferably are in the form of bottom-driven discs, is surmounted by an element of frusto-conical form. These discs, surmounted by their truncated cone, are driven in rotation in such direction that, seen from above in the direction of travel in the working position, the left outer disc surmounted by said frusto-conical element rotates in the clockwise direction while the right outer disc surmounted by said frusto-conical element rotates in the anti-clockwise direction. Despite the directions of rotation of the discs, which with their truncated cone tend to bring the cut fodder towards the interior of the machine, this fodder cannot suitably penetrate into the conditioning passage, if the latter has a width less than the cutting width. Thus the whole of the cut fodder is not conditioned, which of course is very troublesome since the unconditioned fodder dries much less quickly than that which has passed through the conditioning passage.

MOWER-CONDITIONER

INTRODUCTION AND BACKGROUND OF THE INVENTION

The present invention relates to an improvement in mower-conditioners and is directed especially to a mower-conditioner of which the cutting width L is greater than the conditioning width l.

This machine possesses especially the advantage of being very compact and thus light, manoeuvrable and substantially less burdensome than conventional machines whose cutting width is substantially equal to the conditioning width. However, since in this machine the external cutting members are at least partially situated outside the conditioning zone, the fodder cut by the said members has real difficulties in being brought into the said zone even though the supports of these cutting members tend to direct this fodder towards the conditioning members. In fact at least one of said supports, which preferably are in the form of bottom-driven discs, is surmounted by an element of frusto-conical form. These discs, surmounted by their truncated cone, are driven in rotation in such direction that, seen from above in the direction of travel in the working position, the left outer disc surmounted by said frusto-conical element rotates in the clockwise direction while the right outer disc surmounted by said frusto-conical element rotates in the anti-clockwise direction. Despite the directions of rotation of the discs, which with their truncated cone tend to bring the cut fodder towards the interior of the machine, this fodder cannot suitably penetrate into the conditioning passage, if the latter has a width less than the cutting width. Thus the whole of the cut fodder is not conditioned, which of course is very troublesome since the unconditioned fodder dries much less quickly than that which has passed through the conditioning passage.

Moreover a part of the fodder cut by the end discs remains hooked to the edges of the conditioning passage, creates cloggings and is chopped by successive re-cutting.

The purpose of the present invention consists in remedying these drawbacks by proposing a device permitting the fodder, once cut by the cutting members of the outer discs of the mower-conditioner, to slide without hooking over the front edge of the conditioning passage, in order that the whole of the cut fodder may easily pass into the said passage for the purpose of being conditioned.

BRIEF SUMMARY OF THE INVENTION

According to one characteristic of the invention each of the truncated cones surmounting the discs situated outside the conditioning zone is respectively surmounted by a fixed deflector, the flank of which extends at the same time upwards and towards the interior of the conditioning passage, said deflector being connected to the frontal edge of the said conditioning passage in a smoothly continuous manner.

FURTHER DESCRIPTION AND ADVANTAGES OF THE INVENTION

According to another characteristic of the invention each deflector extends towards the front of the machine, seen in its direction of travel, and its convexity faces the ground.

According to a supplementary characteristic of the invention the flank of each deflector is wound upon itself in its rear lower part, substantially with a radius R greater than the radius r with which the said flank winds upon itself in its upper forward part.

According to another characteristic of the invention the front edge of the conditioning passage is connected to the deflector with one or more radii the centre or centres of which are situated in the volume defined by the intersection of a substantially vertical plane passing through the lateral wall of the conditioning passage and a substantially horizontal plane passing through the front edge of the said passage.

In accordance with a supplementary characteristic, considering the mower-conditioner according to the invention in front view, in the direction opposite to its direction of travel, the generating line of each deflector situated outermost of the machine forms an angle greater than 90° with the front edge of the conditioning passage. The generating line of each deflector situated most towards the interior of the machine on the other hand forms an angle substantially equal to 90° with the front edge of the conditioning passage.

The characteristics as described above possess the advantage of guiding almost the whole of the cut fodder in the direction of the conditioning passage.

Furthermore these same characteristics permit of eliminating the reel existing on certain known machines which are necessary to bring the fodder from the cutting device towards the conditioning members. The elimination of this reel thus constitutes a significant gain.

Finally the characteristics of the mower conditioner according to the invention permit of limiting the distance separating the bearings of the conditioning rotor, which advantageously contributes to the rigidity and dynamic balance of the said rotor.

The characteristics stated above thus permit of obtaining in fact a first width reduction of the flow of fodder after its cutting, while a second width reduction of this flow can be obtained by means of windrowing deflectors situated at the rear of the machine. Despite the large cutting width of the mower conditioner according to the invention, the windrow which the said machine forms can thus be collected by forage harvester of conventional type existing on the market, without the need to carry out a supplementary windrowing operation.

BRIEF DESCRIPTION OF THE VIEWS IN THE DRAWINGS

The invention will be explained in greater detail hereinafter, with further characteristics and advantages, by means of the non-limitative description of an example of embodiment of the invention given with reference to the accompanying drawings, wherein:

FIG. 1 shows diagrammatically a plan view of the mower-conditioner according to the invention, hitched in the working position to a tractor, FIG. 2 shows in detail a plan view of the machine, without the tractor necessary for its operation, FIG. 3 represents a front view of the machine according to FIG. 2, FIG. 4 represents a sectional view along the line IV—IV in FIG. 3, FIG. 5 represents a partial perspective front view in the direction of the arrow A in FIG. 2.

DETAILED DESCRIPTION OF THE PREFERRED EMBODIMENTS

Figure 1:
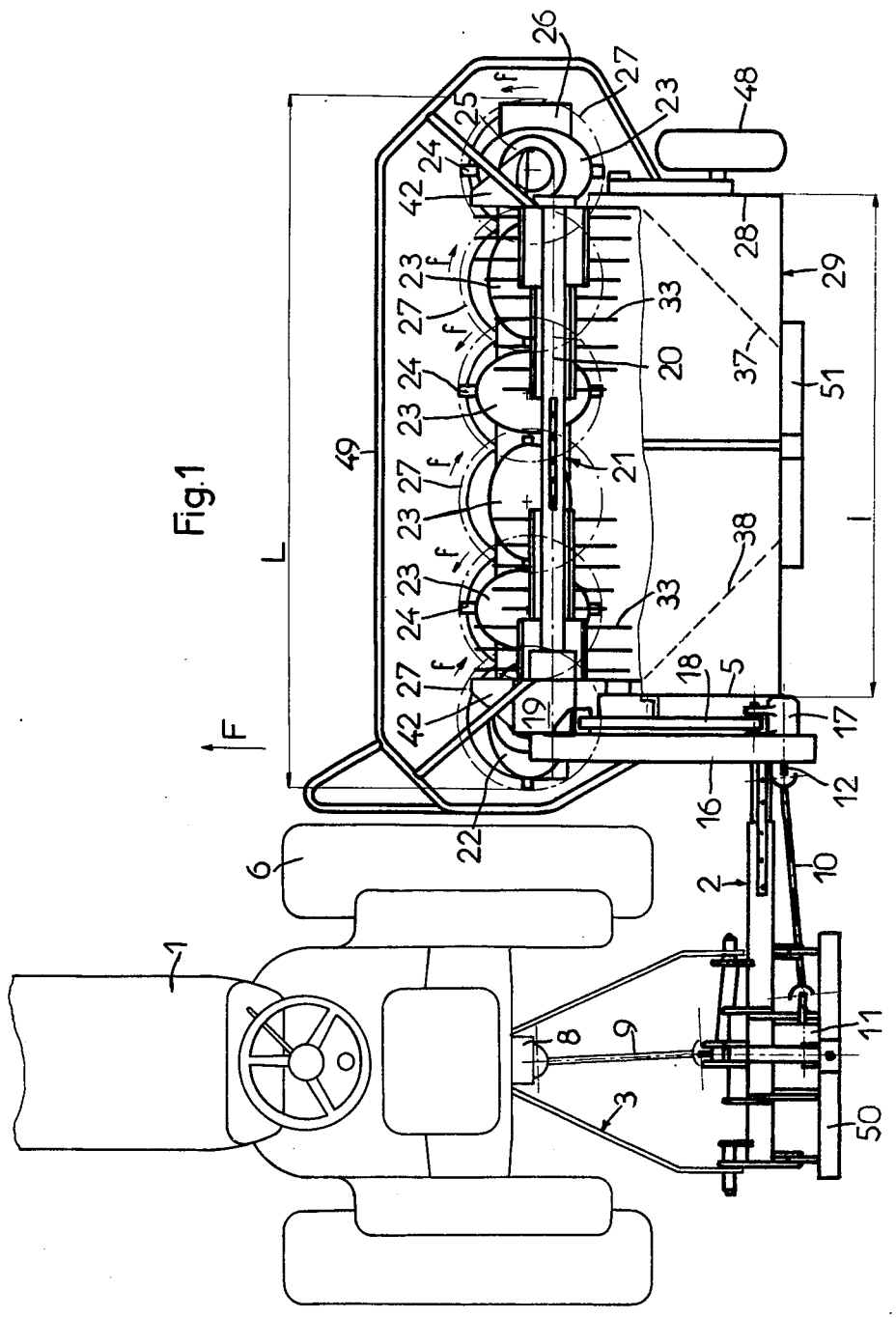

As represented in the accompanying drawings, the mower-conditioner according to the invention is hitched laterally in the working position beside a tractor 1 by means of a hitch device 2. The latter is fixed to the three-point hitch device 3 of the tractor 1 and engages in a socket or tube 4 fast with the lateral wall 5 closer to the right rear wheel 6 of the tractor 1. This hitch device 2 possesses the advantage of permitting the machine to oscillate freely in relation to the tractor 1 about the axis 7 of the socket 4, so that the said tractor 1 can well follow the variation of level of the ground independently of the machine.

The machine comprises a cutting mechanism and a conditioning mechanism driven by the power take-off 8 of the tractor 1, through a certain number of transmission elements such as two telescopic shafts 9 and 10 with cardan joints and a gear box 11 mounted on the hitch device 2. The shaft 10 is connected to the shaft stub 12 of a pulley 13 which is thus driven in rotation. This pulley 13 communicates its rotating movement to a second pulley 14 by means of belts 15 extending parallel along the left lateral wall 5 of the machine, if the latter is considered in its direction F of travel in the working position.

The belts 15 are protected by a casing 16 (FIG. 1). The pulley 13 is mounted on a bearing 17 articulated to the extremity of a post 18 connected rigidly on the one hand to the left lateral wall 5 of the conditioning passage and on the other to a control box 19, which is described in greater detail hereinafter.

The pulley 14 is keyed on a shaft which extends in extension of the axis 20 of the conditioning rotor 21, which will be described hereinafter. The said shaft, driven by the pulley 14, likewise drives a transmission device located in the control box 19 fixed on the left lateral wall 5 of the mower-conditioner according to the invention. This control box 19 possesses an output member (not shown in the accompanying drawings) directed downwards and connected to the cutting element support 22 situated just below the said box 19, while being as close as possible to the right rear wheel 6 of the tractor 1.

On the mower-conditioner as described below and as represented in the accompanying drawings, the cutting element supports are in the form of discs 22, 23. However other cutting element supports could as well be used without departing from the scope of the present invention.

The discs 22 and 23, which are six in number in the accompanying drawings, are provided respectively with two articulated blades 24. These blades 24 place themselves radially in position under the action of centrifugal force on rotation of the discs 22 and 23. In the accompanying drawings it can be seen that the end discs 22 and 23 are respectively surmounted by an element 25 or frusto-conical form, the function of which will be described hereinafter.

As has been seen above, the disc 22 situated closest to the tractor 1 is driven in rotation by one of the output members of the control box 19. Beneath the discs 22 and 23 there extends a housing 26 which is as thin as possible and contains transmission members such as a train of pinions meshing with one another. Certain of these pinions are connected to the discs 22, 23 so that the rotation of the end disc 22 causes the rotation of the other discs 23 in the directions indicated by the arrows f (FIG. 1) through the intermediary of the said pinions.

In this rotation the blades 24 of the disc 22 and 23 describe trajectories 27 forming the cutting front of width L at the front of the machine.

The conditioning rotor 21 is situated above and slightly behind the line on which the substantially vertical axes of the discs 22, 23 are situated. This rotor 21 is driven in rotation in the direction of the arrow b (FIG. 4) by the pulley 14 mounted on the same shaft 20 as that of the rotor 21. The latter is installed between the two lateral walls 5 and 28 of the frame 29 of the machine, which is constituted especially by an assembly of U-irons 30 and by cross-pieces 31, 32 and 52. The rotor 21, whose useful working width extends over the distance 1 separating the walls 5 and 28 of the mower-conditioner according to the invention, in the present example of embodiment is of the type comprising flails 33 cooperating with a fixed comb 34 the position of which is adjustable by means of a handle 35 held by a spring 36. It is thus possible to vary the degree of conditioning of the fodder passing through the machine according to the invention, as desired.

To the rear of the conditioning passage containing the rotor 21 there are provided two windrowing plates 37 and 38, one of which is clearly visible in FIG. 4. These plates 37 and 38, the position of which is regulable by means of a lever 39, permit of adjusting the size of the windrow which the conditioned fodder will form at the exit of the machine.

Without departing from the scope of the invention, the conditioning rotor 21 cooperating with its comb 34 could very well be replaced by profiled rollers made of metal and/or rubber or by other conditioning devices.

As may be seen particularly well from FIG. 1, the width L of the cutting front is clearly greater than the width l of the conditioning passage, the width l of the latter being preferably less than the inter-axial distance of the end discs 22 and 23. These are thus situated at least partially outside the zone of the conditioning passage. Consequently and to facilitate the guidance of the fodder cut by the blades 24 of the discs 22 and 23 towards the said passage, the discs are on the one hand respectively surmounted by the frusto-conical element 24 and on the other hand rotate in such directions that, seen from above, in the direction F of travel of the machine, the disc 22 rotates in the clockwise direction while the other end disc 23 rotates in the anti-clockwise direction. Moreover to favour the transport of the fodder the frusto-conical elements 25 are equipped respectively with ribs 40 and horns 41 permitting better driving of the fodder.

Despite the direction of rotation of the end discs 22 and 23 and despite the presence of the elements 25, 40 and 41, the guidance of the fodder in the direction of the conditioning passage remains imperfect. This is why each of the frusto-conical elements 25 is surmounted by and cooperates with a fixed deflector 42. Each of these deflectors 42 possesses a flank extending simultaneously upward, forward and towards the interior of the conditioning passage in a smoothly continuous manner. This means that the form of each of the deflectors 42 is such that it comprises no sudden change of direction. In other words the various planes in which each of the deflectors 42 is situated are connected with one another by means of curves possessing the largest possible radii. Thus each deflector 42 possesses at least one convex part which according to the invention substantially faces the ground.

Thus not only do these deflectors 42 permit of correctly guiding the fodder cut by the blades 24 of the end discs 22, 23, but also they permit the mower-conditioner equipped according to the invention to raise its rate of output. In fact the machine equipped with the deflectors 42 according to the invention can progress more rapidly, conditioning the whole of the cut fodder, without this fodder being chopped or abandoned on the ground without being conditioned.

The form of the deflectors 42 can be described precisely only with reference to the accompanying drawings, in which it can be seen that the flank of each deflector 42 rolls upon itself. Each deflector 42 tapers from the bottom upwards and from the exterior towards the interior of the machine, and the radius R on which the lower part of each flank rolls upon itself is greater than the radius r on which the upper part of the flank of each of the deflectors 42 rolls upon itself. This permits the deflectors 42 to be connected in a smoothly continuous way, to the forward front edge 43 of the conditioning passage extending between the lateral walls 5 and 28 of the mower-conditioner. This edge 43 in fact likewise rolls upon itself in the direction of the exterior of the conditioning passage, with a radius r' corresponding substantially to the radius r on which the upper part of the flank of each deflector 42 rolls upon itself.

In a variant of execution of the invention it is possible to provide that the edge 43 of the conditioning passage rolls upon itself in the direction of the interior of the conditioning passage. As regards the radius R by which the lower part of the flank of each deflector 42 rolls upon itself, it corresponds substantially to the radius R' of the upper part of each of the frusto-conical elements 25.

The fodder cut by the blades 24 of the end discs 22, 23 is transported by the said discs cooperating with their truncated cones 25 so as to cause the said fodder to penetrate into the conditioning passage, causing it to slide over the outer face of each of the deflectors 42, that is to say over the faces of the said deflectors 42 which face the ground. The fodder thus guided continues its path sliding over the front edge 43 of the conditioning passage before being snatched up by the flails 33 of the rotor 21 for the purpose of being conditioned. This is why the said edge 43 is connected at each of its extremities to the deflectors 42 along one or more radii or the like, the centre or centres of which are situated in a volume defined by the intersection of a substantially vertical plane P passing through each of the lateral walls 5 and 28 of the conditioning passage, and a substantially horizontal plane S passing through the front edge 43 of the said passage. Thus there exists no sharp part capable of constituting a brake upon the flow of fodder sliding from the deflectors 42 over the edge 43 towards the conditioning members 33.

To complete the description of the deflectors 42, considering FIG. 2 which represents a front view of the machine in the direction opposite to its direction F of travel, it can be seen that the generating line 44 of each deflector 42 situated outermost of the said machine forms an angle $\alpha$ greater than 90° with the front edge 43 of the conditioning passage. The generating line 45 of each deflector 42 situated innermost of the machine on the other hand forms an angle $\beta$ substantially equal to 90° with the front edge 43 of the conditioning passage.

The deflectors 42 are respectively fixed along their generating lines 45 to the lateral walls 5 and 28 of the conditioning passage by means of screws 46. The outer edge of the deflector 42 surmounting the end disc 23 is connnected on the side of its concave face by a bracket 47 to the lateral wall 28 of the conditioning passage. The deflector 42 situated closest to the right rear wheel 6 of the tractor 1 is placed partially before the control box 19 for the purpose of protecting it. This deflector 42 is connected at the same time to the said box 19 and to the lateral wall 5.

In a variant of execution of the invention this connection can be completed by means of a bracket similar to the strap 47 of the deflector 42 located over the end disc 23.

The mower-conditioner according to the invention, the frame 29 of which is supported by wheels 48, is likewise provided with a safety rail 49. The latter prevents the cutting members of the machine from coming too close to obstacles such for example as trees.

Moreover from the Figures it can be seen that two complementary hitch devices 50 and 51 are provided on the one hand to the rear of the machine and on the other to the rear of the hitch device 2 connected to the tractor 1. These two complementary hitch devices 50 and 51, which can advantageously have the form of a male triangle and a female triangle, constitute the transport device of the machine. It is in fact sufficient to couple the two devices 50 and 51, then lift the three-point hitch device 3 of the tractor 1 so that the machine may be displaced, then being situated in the mounted position.

Moreover it is quite apparent that various improvements, modifications or additions may be made to the machine as described above, and that it will be possible to replace certain elements by equivalent elements, without departing from the scope of the present invention.

What is claimed is:

1. A mower-conditioner comprising a cutting mechanism, at least one rotating element over said cutting mechanism, means to rotate said element about a vertical axis, a conditioning mechanism comprising at least one rotor, and means to drive said at least one rotor about a horizontal axis, said rotor being disposed in a conditioning passage the width of which is less than the cutting width, said rotating element being disposed laterally outside said conditioning passage and being in the form of a truncated cone that separates standing fodder from cut fodder, and a fixed deflector disposed above said truncated cone and extending forwardly upwardly and also toward the interior of said conditioning passage and merging with a front edge of said conditioning passage in a smoothly continuous manner.

2. A mower-conditioner according to claim 1, in which each said deflector is forwardly downwardly concave.

3. A mower-conditioner according to claim 1 or 2, in which each deflector has upper and lower portions, said upper portions having radii of curvature less than the radii of curvature of said lower portions.

4. A mower-conditioner according to claim 3, wherein the flank of each deflector rolls upon itself in its upper part on a radius substantially corresponding to the radius of the front edge of the conditioning passage whereas the said flank rolls upon itself in its lower part on a radius corresponding substantially to the radius of the upper part of the truncated cone.

5. A mower-conditioner comprising a cutting mechanism with discs driven from beneath about vertical axes and a conditioning mechanism comprising a rotor driven in rotation about a horizontal axis, said rotor extending in a conditioning passage the width of which is less than the cutting width, the discs situated outside the zone in which the conditioning mechanism extends being respectively provided with a truncated cone intended to separate the standing fodder from the cut fodder, each of these truncated cones being respectively surmounted by a fixed deflector the flank of which extends at the same time upward, forward and towards the interior of the conditioning passage, these flanks being rolled upon themselves in their lower part substantially on a radius greater than the radius on which the said flanks are rolled upon themselves in their upper part in such manner that their convexity faces the ground, the said deflectors being connected to the front edge of the conditioning passage on one or more radii the center or centers of which are situated in the volume defined by the intersection of a substantially vertical plane passing through the lateral wall of the conditioning passage and of a substantially horizontal plane passing through the front wall of the said passage.

6. A mower-conditioner according to claim 5, wherein, seen from the front in the direction opposite to the direction of travel of the machine, the generating line of each deflector situated most towards the exterior of the machine forms an angle greater than 90° with the front edge of the conditioning passage.

7. A mower-conditioner according to claim 6, wherein, seen from the front in the direction opposite to the direction of travel of the machine, the generating line of each deflector situated most towards the interior of the machine forms an angle substantially equal to 90° with the front edge of the conditioning passage.

8. A mower-conditioner comprising a cutting mechanism with discs driven from beneath and a conditioning mechanism extending in a conditioning passage the width of which is less than the cutting width, the discs situated outside the zone in which the conditioning mechanism extends being respectively provided with a truncated cone intended to separate the standing fodder from the cut fodder, each of these truncated cones being respectively surmounted by a fixed deflector the flank of which extends at the same time upward, forward and towards the interior of the conditioning passage, these flanks being rolled upon themselves in their lower part substantially on a radius greater than the radius on which the said flanks roll upon themselves in their upper part, at least one of these flanks being partially placed before a casting, and connected to the latter, this casing serving on the one hand for the drive of the conditioning rotor and on the other for the drive of the discs, each deflector being connected on the side of its concave face to the lateral wall of the conditioning passage by means of a bracket.

* * * * *